United States Patent
Nishijima (10) Patent No.: US 8,937,479 B2
(45) Date of Patent: Jan. 20, 2015

(54) POSITION DETECTION DEVICE

(75) Inventor: Akio Nishijima, Miyagi-ken (JP)

(73) Assignee: Alps Electric Co. Ltd., Tokyo (JP)

( * ) Notice: Subject to any disclaimer, the term of this patent is extended or adjusted under 35 U.S.C. 154(b) by 264 days.

(21) Appl. No.: 13/529,500

(22) Filed: Jun. 21, 2012

(65) Prior Publication Data

US 2013/0026026 A1  Jan. 31, 2013

(30) Foreign Application Priority Data

Jul. 26, 2011 (JP) .................... 2011-163552

(51) Int. Cl.
G01R 27/26 (2006.01)
G01D 5/241 (2006.01)

(52) U.S. Cl.
CPC .................... *G01D 5/2412* (2013.01)
USPC ............................ 324/662; 324/658

(58) Field of Classification Search
USPC ................................ 324/658, 662
See application file for complete search history.

(56) References Cited

U.S. PATENT DOCUMENTS 2,506,814 A * 5/1950 Sayre ................... 219/770

FOREIGN PATENT DOCUMENTS

JP  2006-349447  12/2006
JP  2011-011617  1/2011

* cited by examiner

*Primary Examiner* — Vincent Q Nguyen
(74) *Attorney, Agent, or Firm* — Hunton & Williams LLP (57) ABSTRACT

A shift lever, a shift knob provided on an upper end of the shift lever, an electrode portion provided on a lower end of the shift lever, an operation fulcrum rotatably supporting the shift lever, and a capacitive coupling sensor located in non-contact with the electrode portion are included. By a movement operation of the shift knob, the shift lever rotates and the electrode portion moves while keeping non-contact with a surface of the capacitive coupling sensor. The capacitive coupling sensor detects a position of the electrode portion on the basis of a capacitance change caused with movement of the electrode portion. By so doing, shift position information and trajectory information between each shift position can be obtained.

9 Claims, 8 Drawing Sheets

POSITION DETECTION DEVICE

CLAIM OF PRIORITY

This application contains subject matter related to and claims the benefit of Japanese Patent Application No. 2011-163552 filed on Jul. 26, 2011, the entire contents of which is incorporated herein by reference.

BACKGROUND OF THE DISCLOSURE

1. Field of the Disclosure

The present disclosure relates to a position detection device capable of detecting a shift position and a movement trajectory, for example, when a shift lever is operated to move.

2. Description of the Related Art

Japanese Unexamined Patent Application Publication Nos. 2006-349447 and 2011-11617 each disclose a position detection device that includes a magnet provided on a side opposite to a shift-knob side of a shift lever and a plurality of sensors (e.g., Hall ICs) arranged so as to be spaced apart from the magnet.

Each sensor is located so as to face the magnet when the shift knob is operated to move to each shift position. For example, when the shift knob is operated to move from a parking range to a drive range, the sensor located at the drive range receives a magnetic field from the magnet and outputs a detection signal, whereby it can be known that the shift lever has moved to the drive range. In addition, the shift knob is operated to move from the parking range to the drive range through a reverse range and a neutral range, and detection signals at the respective shift positions are obtained in order, whereby it can be confirmed that the shift lever has moved correctly to the parking range, the reverse range, the neutral range, and the drive range in order.

However, the related art has the following problems. A sensor and a switch are required at each shift position, and each time the arrangement of the shift positions is changed, designing is required. Accordingly, the cost is high and the reliability is low since the number of sensors and the number of sensors are large.

In addition, in the related art, an ON/OFF signal is sensed at each shift position, but a movement trajectory of the shift lever cannot be known. In other words, for example, in the related art, movement of the shift lever from the neutral range to the drive range can be known through an ON/OFF signal at each shift position, but a trajectory along which the shift lever moves from the neutral range to the drive range cannot be known.

These and other drawbacks exist.

SUMMARY OF THE DISCLOSURE

The present disclosure provides a position detection device that reduces its cost as compared to the related art and has excellent reliability.

The present disclosure provides a position detection device including: a movable body; an operation portion provided on a first end side of the movable body; an electrode portion provided on a second end of the movable body, the second end being located opposite to the first end; a support body movably supporting the movable body such that the operation portion can be operated to move; and a capacitive coupling sensor located in non-contact with the electrode portion. By a movement operation of the operation portion, the movable body moves and the electrode portion moves while keeping non-contact with a surface of the capacitive coupling sensor. The capacitive coupling sensor detects a position of the electrode portion on the basis of a capacitance change caused with movement of the electrode portion.

In the present disclosure, the electrode portion is provided on the second end side of the movable body, and the capacitive coupling sensor is provided in non-contact with the electrode portion. By operating the operation portion, provided on the first end of the movable body, to move, the movable body moves, and accordingly the electrode portion moves while keeping non-contact with the surface of the capacitive coupling sensor. By so doing, a position of the operation portion (electrode portion) can be sensed with a single sensor. In addition, even when the arrangement of positions to which the operation portion can be operated to move is changed, it is not necessary to change the configuration of a detection section composed of the electrode portion and the capacitive coupling sensor, and the detection section can be standardized.

As described above, only a single sensor is enough, the cost can be reduced, and the reliability can be improved.

Also, the operation portion can be operated to move along a predetermined trajectory between a plurality of positions, and position information and trajectory information of the operation portion can be obtained by detection of the position of the electrode portion with the capacitive coupling sensor. Not only the position information of the operation portion but also the trajectory information thereof can be obtained, and it is possible to obtain higher reliability.

The movable body may be supported so as to be horizontally movable, or the movable body may be rotatably supported via an operation fulcrum between the first end and the second end and the electrode portion may move in a direction opposite to a direction in which the operation portion is operated to move.

A spacer is provided on the surface of the capacitive coupling sensor so as to be in non-contact with the electrode portion, the surface of the capacitive coupling sensor facing the electrode portion. Since the spacer is provided in the space between the electrode portion and the capacitive coupling sensor, the detection sensitivity can be enhanced.

Further, a spacer is provided on the surface of the capacitive coupling sensor so as to be in non-contact with the electrode portion, the surface of the capacitive coupling sensor facing the electrode portion, and a surface of the spacer is formed as such a concavely curved surface that a thickness of the spacer increases as distance from the operation fulcrum along a plane direction increases. By so doing, change in the detection sensitivity can be alleviated.

DETAILED DESCRIPTION OF THE DISCLOSURE

The following description is intended to convey a thorough understanding of the embodiments described by providing a number of specific embodiments and details involving position detection device. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

Figure 1:
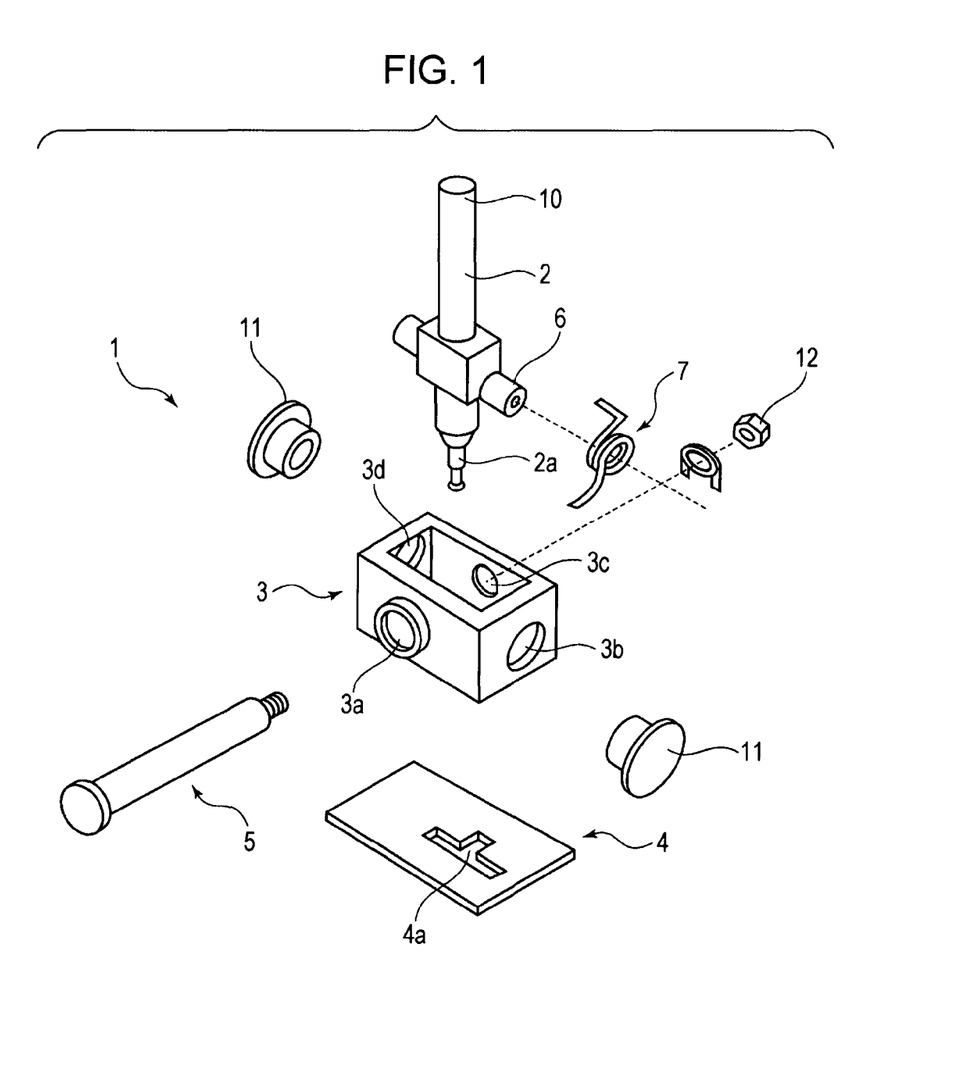
FIG. 1 is an exploded perspective view of a shift position detection device according to an embodiment of the present disclosure.

FIG. 1 is an exploded perspective view of a shift position detection device according to an exemplary embodiment. The shift position detection device 1 shown in FIG. 1 may be mounted in a vehicle.

The shift position detection device 1 may include a shift lever (shaft) 2, a bearing 3, a shift pattern restricting plate 4, a first shaft portion 5 connected to the shift lever 2 and extending in an X direction, a second shaft portion 6 extending in a Y direction, and a home position returning spring 7.

A shift knob (operation portion) 10 may be provided on an upper end (first end) of the shift lever 2 shown in FIG. 1. A portion of the shift lever 2 may be stored in a space within the bearing 3. Side surfaces of the bearing 3 have through holes 3a to 3d, respectively, and the first shaft portion 5 and the second shaft portion 6 connected to the shift lever 2 are inserted through the through holes 3a to 3d. In a state in which the second shaft portion 6 is stored so as to extend from the inside of the bearing 3 toward the through holes 3b and 3d, restricting members 11 may be fitted into the through holes 3b and 3d from the outside. In addition, in a state in which the shift lever 2 is located in the bearing 3, the first shaft portion 5 may be inserted through the through hole 3a from the outside, and the through hole 3c side of the first shaft portion 5 may be prevented from pulling out by a nut 12.

The shift lever 2 may be provided with a restricting portion 2a that can be located in a shift pattern 4a of a space provided in the shift pattern restricting plate 4, for operating the shift lever 2 to move along the shift pattern 4a.

The shift lever 2 may be urged by the home position returning spring 7 so as to return to a home position if a hand is released from the shift lever 2 even when the shift lever 2 is operated to move along the shift pattern 4a.

Due to a support structure in which the first shaft portion 5 and the second shaft portion 6 connected to the shift lever 2, the bearing 3, and the like are assembled, the shift lever 2 can be supported so as to be rotatable about a later-described operation fulcrum.

Figure 2:
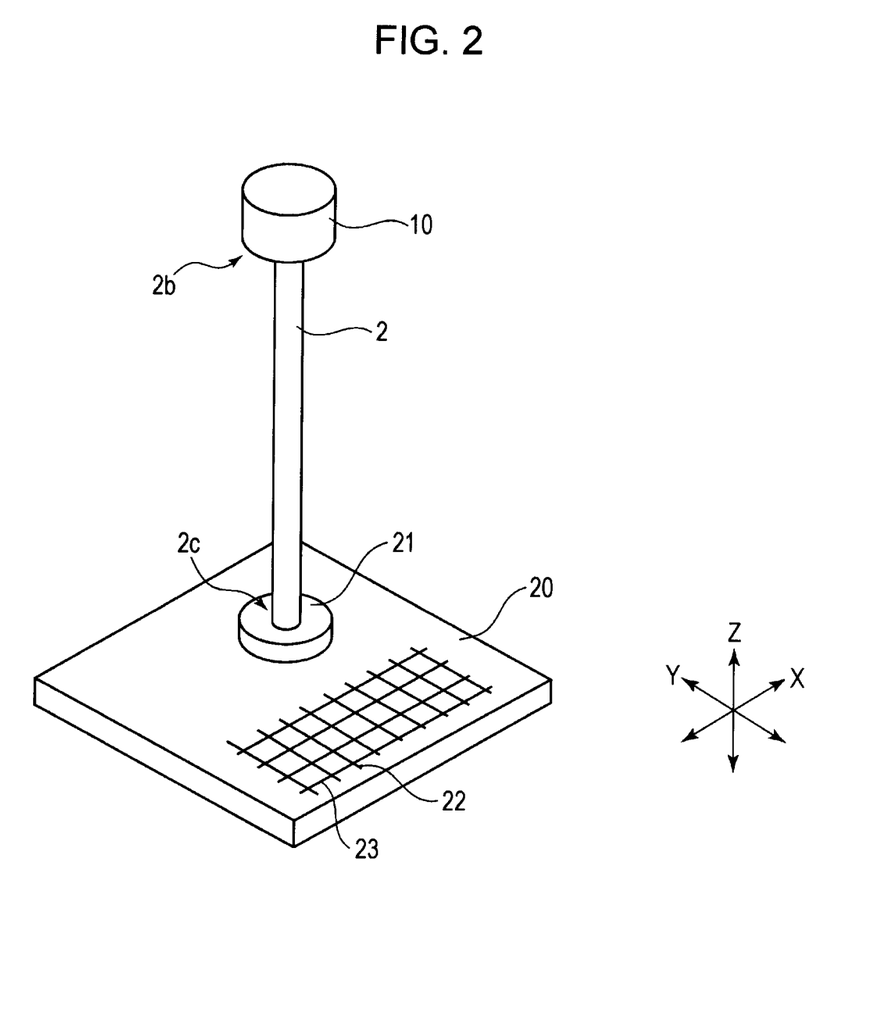
FIG. 2 is a perspective view schematically showing a shift lever and a capacitive coupling sensor constituting the shift position detection device according to an embodiment of the present disclosure.

FIG. 2 is a perspective view schematically showing the shift lever 2 and a capacitive coupling sensor 20 constituting the shift position detection device according to an exemplary embodiment. The capacitive coupling sensor 20 may be located below the shift pattern restricting plate 4 shown in FIG. 1.

As shown in FIG. 2, the shift knob (operation portion) 10 may be provided on the upper end (first end) 2b of the shift lever 2, and an electrode portion 21 may be provided on the lower end (second end) of the shift lever 2. The electrode portion 21 may be a metal such as brass. The electrode portion 21 may be connected to a ground in order to stabilize detection accuracy, or may not be connected to the ground.

Figure 3:
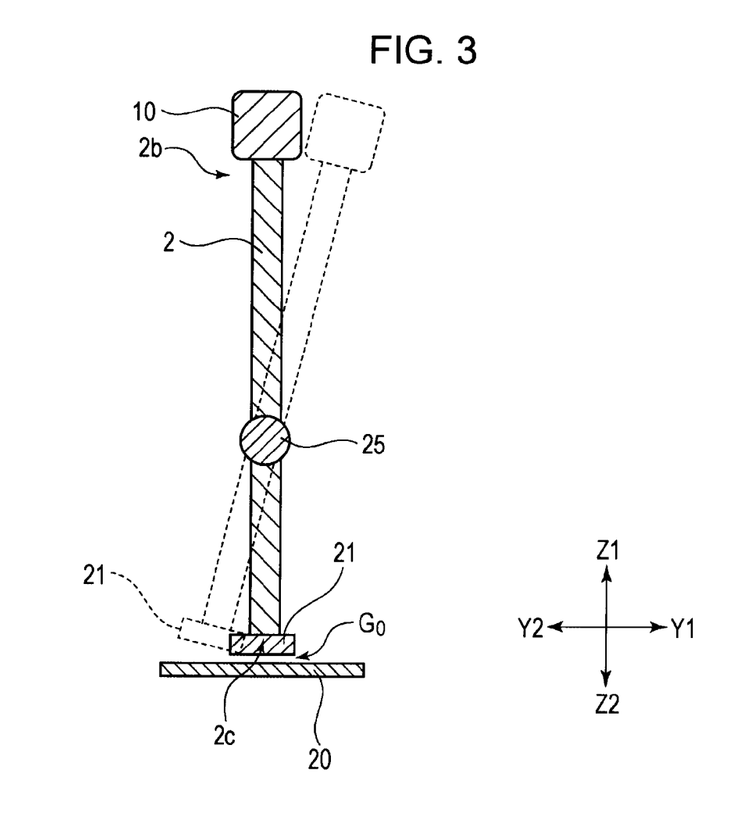
FIG. 3 is a vertical cross-sectional view of the shift lever and the capacitive coupling sensor shown in FIG. 2.

The capacitive coupling sensor 20 shown in FIG. 2 may have a gap $G_0$ between the electrode portion 21 and the capacitive coupling sensor 20 and may be located in non-contact with the electrode portion 21 as shown in FIG. 3.

The capacitive coupling sensor 20 may not be particularly limited in configuration, as long as it can detect the position of the electrode portion 21 in the X direction and the Y direction on the basis of a capacitance change caused by a capacitance being formed between the electrode portion 21 and the capacitive coupling sensor 20. For example, as shown in FIG. 2, the capacitive coupling sensor 20 may have an internal structure in which X electrodes 22 extending in the Y direction and arranged at intervals in the X direction and Y electrodes 23 extending in the X direction and arranged at intervals in the Y direction face each other across an insulation layer. In FIG. 2, only one X electrode and one Y electrode are designated at reference sings 22 and 23.

When a capacitance occurs between the electrode portion 21 and X electrodes and Y electrodes close to the electrode portion 21, a current flowing when a drive voltage may be applied to the electrodes changes, a delay of rising of a voltage occurs, and these changes are detected, whereby the position of the electrode portion 21 can be detected.

As shown in FIG. 3, the operation fulcrum 25 may be provided between the upper end 2b and a lower end 2c of the shift lever 2. The shift lever 2 may be rotatably supported via the operation fulcrum 25. The operation fulcrum 25 may be he shaft portions 5 and 6 shown in FIG. 1 and may indicate the first shaft portion 5 in FIG. 3. When the shift knob 10 shown in FIG. 3 is operated to move, for example, substantially in a Y1 direction, the shift lever 2 may rotate about the second shaft portion 6 as the operation fulcrum 25 and the electrode portion 21 moves substantially in a Y2 direction that is opposite to the direction in which the shift knob 10 is operated to move.

In such an embodiment, when the shift knob 10 is operated to move to a predetermined shift position in the Y1 direction from a state in which the shift lever 2 is at the home position standing parallel to a Z1-Z2 direction (a solid line) as shown in FIG. 3, the shift lever 2 may rotate about the operation fulcrum 25 and the electrode portion 21 may move in the Y2 direction (a dotted line). The position of the electrode portion 21, at the home position, which is indicated by the solid line can be detected by the capacitive coupling sensor 20, and the position of the dotted line to which the electrode portion 21 has moved can also be detected by the capacitive coupling sensor 20. In addition, the movement trajectory of the electrode portion 21 from the solid line to the dotted line can also be detected by the capacitive coupling sensor 20.

Figure 4:
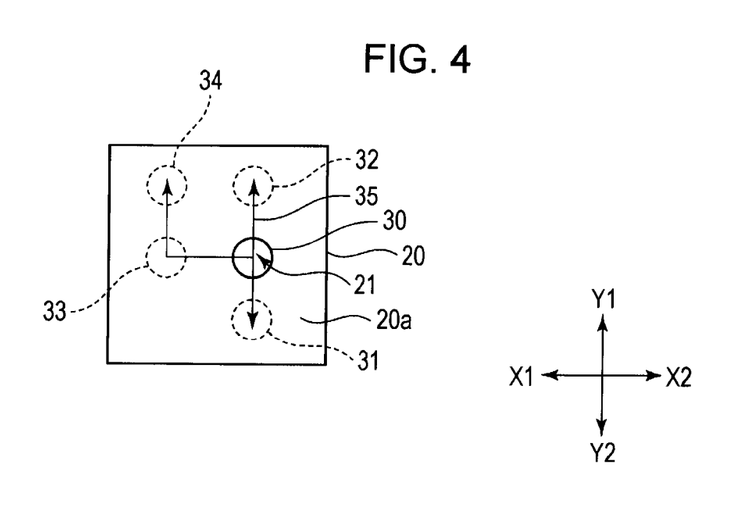
FIG. 4 is a plan view of the capacitive coupling sensor and, in particular, is a diagram schematically illustrating a shift pattern according to an embodiment of the present disclosure.

FIG. 4 is a plan view of the capacitive coupling sensor 20 and, in particular, is a diagram schematically illustrating a shift pattern. The shift pattern shown in FIG. 4 is restricted by the shift pattern 4a of the shift pattern restricting plate 4 shown in FIG. 1.

As shown in FIG. 4, a plurality of circles are indicated on a surface 20a of the capacitive coupling sensor 20. Each circle indicates a determination area for a shift position at which the electrode portion 21 faces the surface 20a of the capacitive coupling sensor 20 when the shift knob 10 is operated to move to each shift position. Each arrow indicates a movement trajectory of the electrode portion 21. The same applies to FIGS. 8, 10B, and 11B.

The electrode portion 21 may be located in a determination area for a shift position indicated by a solid line in FIG. 4, and the shift position may be a determination area 30 for a neutral range which is the home position. The shift lever 2 may be urged to the neutral range by the home position returning spring 7 shown in FIG. 1. When the shift knob 10 is operated to move to a reverse range in the Y1 direction, the shift lever 2 may rotate about the second shaft portion 6. At that time, the electrode portion 21 may move in the direction opposite to the direction in which the shift knob 10 is operated to move, from the determination area 30 for the neutral range to a determination area 31 for the reverse range. Meanwhile, when the shift knob 10 may be operated to move from the neutral range to a drive range on the Y2 side, the shift lever 2 may rotate about the second shaft portion 6. At that time, the electrode portion 21 may move in the direction opposite to the direction in which the shift knob 10 is operated to move, from the determination area 30 for the neutral range to a determination area 32 for the drive range on the Y1 side. In addition, when the shift knob 10 is operated to move from the neutral range in an X2 direction and further operated to move in the Y2 direction to shift to a B range, the shift lever 2 may rotate about the first shaft portion 5 and the electrode portion 21 may move from the determination area 30 for the neutral range to a determination area 33 for a relay position on the X1 side. Subsequently, the shift lever 2 may rotate about the second shaft portion 6 and the electrode portion 21 may move to a determination area 34 for the B range on the Y1 side.

In the embodiment, by detecting the position of the electrode portion 21 on the capacitive coupling sensor 20, it is possible to obtain a movement trajectory between each shift position and information that the shift knob 10 has moved from the neutral range to each shift position. In other words, when the electrode portion 21 is located in the determination area 32 for the drive range shown in FIG. 4, it is known that the shift knob 10 is at the drive range. In addition, a movement trajectory 35 from the determination area 30 for the neutral range to the determination area 32 for the drive range can also be detected, and thus the movement trajectory of the shift knob 10 can also be known.

As described above, in such an embodiment, the position of the shift knob 10 (electrode portion 21) can be sensed by using the single capacitive coupling sensor 20. In the related art, a sensor has to be disposed for each shift position. But in the various embodiments according to the disclosure, a single sensor is enough. In addition, in the related art, each time the shift positions are rearranged, it is necessary to rearrange the sensors, and errors caused due to the sensor arrangement are likely to occur. However, in the various embodiments according to the disclosure, even when the positions of the determination areas for the respective shift positions and the trajectories between the determination areas for the respective shift positions are changed from FIG. 4, for example, to FIG. 8, this change can be handled only by changing programs for positional information of the respective shift positions and trajectory information, that is, it is not necessary to change the configuration of a detection section composed of the electrode portion 21 and the capacitive coupling sensor 20. Thus, in the various embodiments, the detection section can be standardized.

As described above, a single sensor is enough, the cost can be reduced, and the reliability can be improved.

Further, it is possible to know not only information of each shift position but also trajectory information between each shift position. For example, in the related art, it can be detected that the shift lever has moved from the neutral range to the drive range, but the movement trajectory between the neutral range and the drive range cannot be known. For example, as shown in FIG. 4, if the movement trajectory 35 from the determination area 30 for the neutral range to the determination area 32 for the drive range, which movement trajectory 35 is linear in the Y1 direction, is set as a normal trajectory, when the movement trajectory 35 is actually a non-linearly drawn trajectory, it can be determined that a defect such as breakdown has occurred in a support mechanism to support the shift lever 2, resulting in further increase in safety during driving. Therefore, when movement trajectory information can also be obtained as in the embodiment, the shift position detection device 1 can be made more reliable.

Figure 5:
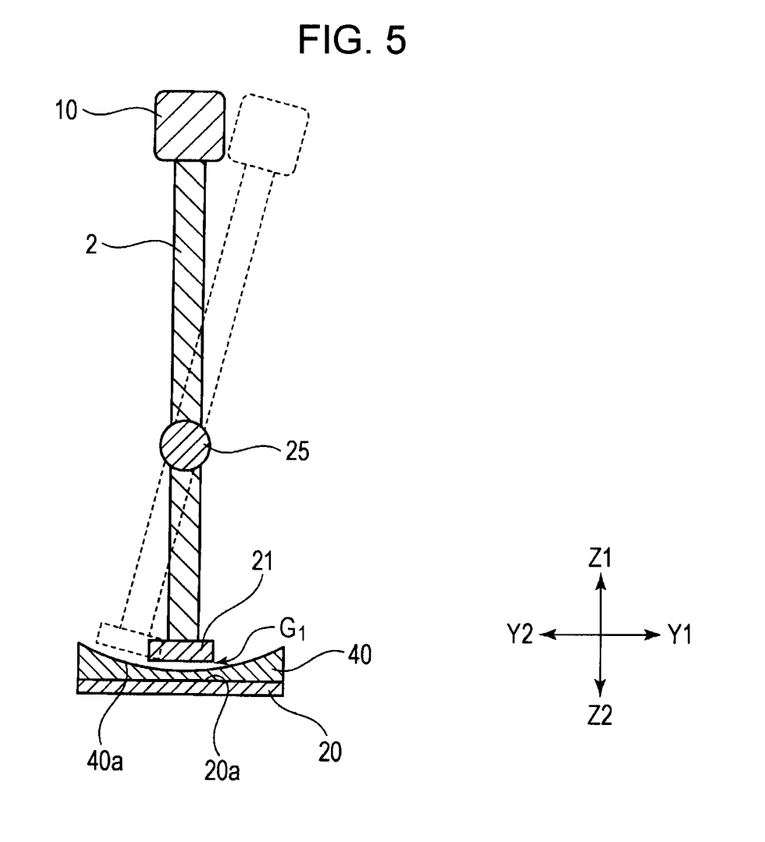
FIG. 5 is a vertical cross-sectional view in which a spacer is provided on a surface of the capacitive coupling sensor shown in FIG. 3.

Meanwhile, in various embodiments according to the disclosure, the electrode portion 21 and the capacitive coupling sensor 20 may be in non-contact with each other and the gap $G_0$ is provided as shown in FIG. 3. In this case, air (the relative dielectric constant is about 1) may be present between the electrode portion 21 and the capacitive coupling sensor 20, but as shown in FIG. 5, a spacer 40 whose relative dielectric constant is higher than that of air is preferably provided between the electrode portion 21 and the capacitive coupling sensor 20. As shown in FIG. 4, the spacer 40 may be fixed to the surface 20a of the capacitive coupling sensor 20 by means of adhesion. The spacer 40 and the electrode portion 21 may be in non-contact with each other and a gap $G_1$ is provided between the spacer 40 and the electrode portion 21.

The spacer 40 may be formed from a resin material such as a polyacetal resin or a neoprene rubber, and the relative dielectric constant of the spacer 40 may be about 2 to 10.

When the spacer 40 is provided on the surface 20a of the capacitive coupling sensor 20, a capacitance formed between the electrode portion 21 and the capacitive coupling sensor 20 can be made high. Thus, a capacitance change caused in the capacitive coupling sensor 20 becomes great, and the detection sensitivity can be enhanced. Even when the gap $G_1$ shown in FIG. 5 is slightly larger than the gap $G_0$ shown in FIG. 3, the detection sensitivity can be enhanced. Thus, as in FIG. 5, the allowable range of the gap can be widened by providing the spacer 40. In addition, even when the gap distance changes due to engineering changes to the shift positions and the shift knob, the gap can easily be adjusted by proving a spacer.

Moreover, in the configuration in which the shift lever 2 shown in FIG. 3 rotates about the operation fulcrum 25, the gap $G_0$ between the electrode portion 21 and the capacitive coupling sensor 20 can change with the rotation. Thus, a detection sensitivity difference corresponding to the change of the gap $G_0$ occurs. In order to reduce the detection sensitivity difference, a surface 40a is preferably formed as such a concavely curved surface that the thickness of the spacer 40 gradually increases as distance from the operation fulcrum 25 along the plane direction increases, as shown in FIG. 4. By so doing, the gap $G_1$ between the spacer 40 and the electrode portion 21 can be substantially uniformed even when the electrode portion 21 moves.

Figure 6:
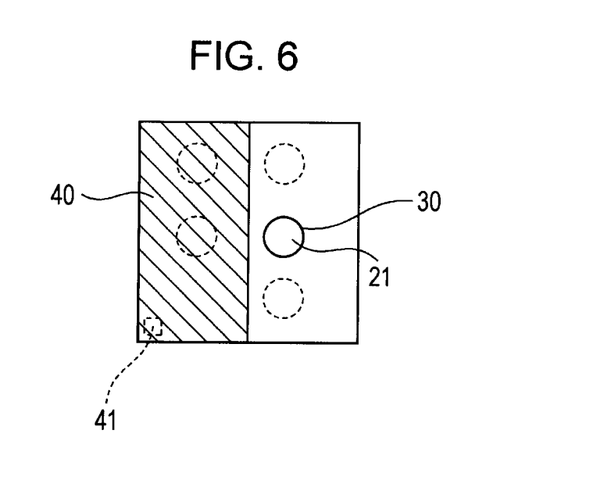
FIG. 6 is a diagram illustrating a method for correcting a capacitance corresponding to an environmental change or the like (a plan view of the capacitive coupling sensor) according to an exemplary embodiment of the present disclosure.

FIG. 6 is a diagram illustrating a method for correcting a capacitance corresponding to an environmental change or the like (a plan view of the capacitive coupling sensor).

In the capacitance type position detection, an erroneous operation may occur due to external noise or an environmental change caused such as by a rise in temperature or humidity. Thus, a detection signal may be corrected. In such an embodiment, the correction method is not limited, but in one example, when the electrode portion 21 is located in the determination area 30 for the neutral range, for example, a correction value may be obtained on the basis of a reference output obtained when a drive voltage is applied to an electrode in a left-half region (indicated by oblique lines) 40 where the electrode portion 21 is not located. In addition, as shown in FIG. 6, a correction portion 41 for obtaining a correction detection signal can be provided at a corner or the like of the capacitive coupling sensor 20. For example, the correction portion 41 may have a configuration in which a correction electrode and a correction detection electrode face each other, and a capacitance occurs between the correction electrode and the correction detection electrode. A correction value (correction detection signal) can be obtained on the basis of the value of a current flowing in the correction detection electrode when a drive voltage is applied to the correction electrode. The timing of correction may include, but is not limited thereto, a time when an engine is started, and every constant time during travelling.

Figure 7:
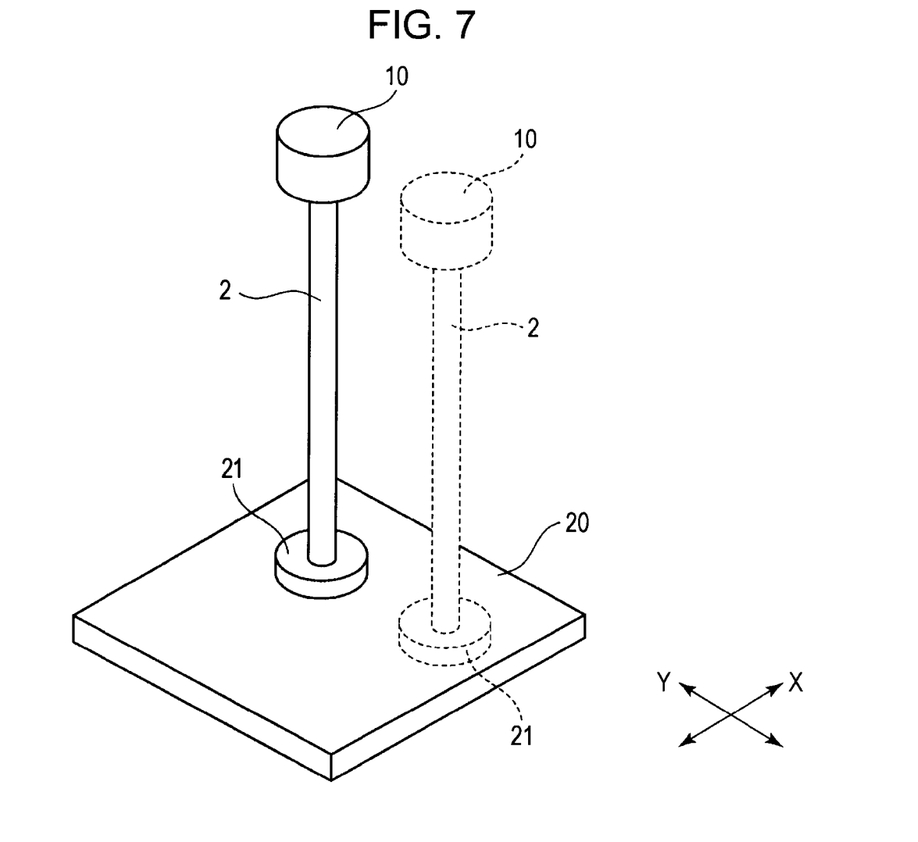
FIG. 7 is a perspective view of a shift lever and a capacitive coupling sensor according to an embodiment of the present disclosure.

In such an embodiment, a configuration may be provided in which the shift lever 2 horizontally moves along the X-Y plane as shown in FIG. 7. FIG. 7 shows a state in which the shift lever 2 has moved to a shift lever position indicated by a dotted line. Also, the capacitive coupling sensor 20 and the electrode portion 21 provided at the lower end of the shift lever 2 may be in non-contact with each other. In the horizontally moving configuration shown in FIG. 7, the position of the shift knob 10 on the X-Y plane and the position of the electrode portion 21 on the X-Y plane may substantially coincide with each other. In other words, unlike the rotation type shown in FIG. 3, the direction in which the shift knob 10 is operated to move and the direction in which the electrode portion 21 moves are not opposite to each other and are the same.

Figure 8:
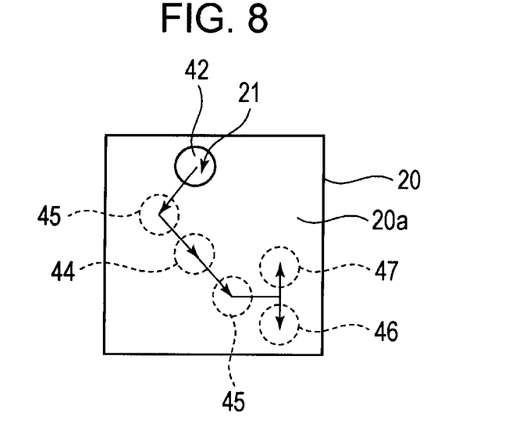
FIG. 8 is a plan view of the capacitive coupling sensor and is a diagram schematically a shift according to an embodiment of the present disclosure.

For example, FIG. 8 shows a shift pattern with the configuration in which the shift lever 2 is horizontally moved as shown in FIG. 7. With a movement operation of the shift knob 10, the electrode portion 21 may move between the determination areas 42 to 47 for the respective shift positions while keeping non-contact with the surface of the capacitive coupling sensor 20. When the shift knob 10 is operated to move to the drive range from a state in which the shift knob 10 is located in a parking range, the electrode portion 21 may move from a determination area 42 for the parking range via a determination area 43 for the reverse range and a determination area 44 for the neutral range to a determination area 45 for the drive range on the capacitive coupling sensor 20 as shown in FIG. 8. At this time, not only shift position information of the shift knob 10 (electrode portion 21) but also movement trajectory information between each shift position can be obtained by the capacitive coupling sensor 20.

Figure 9:
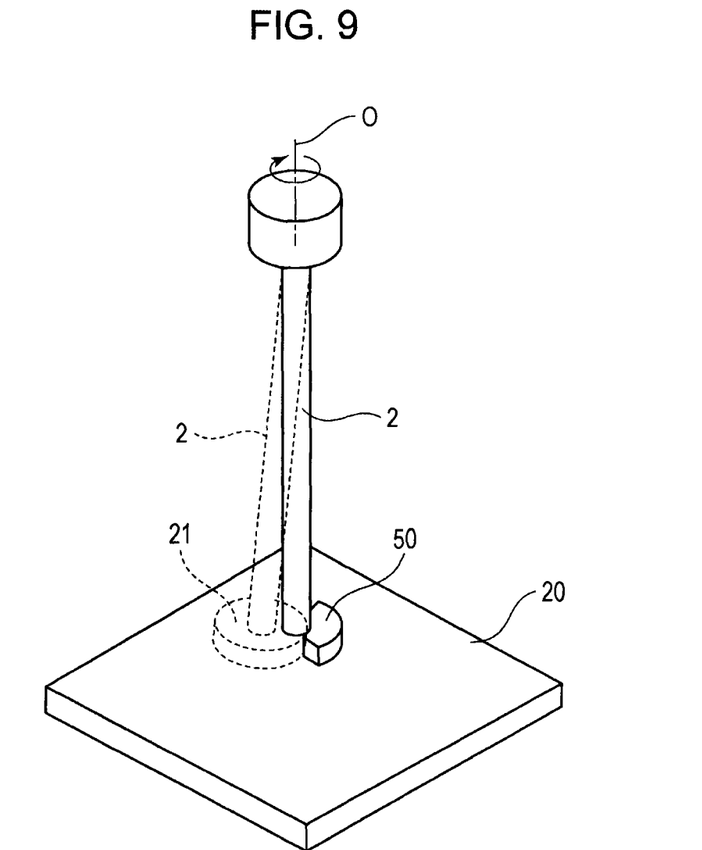
FIG. 9 is a perspective view of the shift lever and the capacitive coupling sensor, showing a state in which an operation portion of the shift lever is rotated according to an embodiment of the present disclosure.

FIG. 9 shows a state where the shift knob 10 of the shift lever 2 is rotated. The shift knob 10 may be supported so as to be rotatable about a rotation axis O. When the shift knob 10 is rotated, the shift lever 2 connected to the shift knob 10 also rotates. Thus, an electrode portion 50 provided on the lower end of the shift lever 2 also rotates. In this case, when the electrode portion 50 is formed to not have a circular planar shape as shown in FIG. 2 and have a planar shape in which the position of the electrode portion 50 changes with rotation of the shift lever 2 (a quarter circle in FIG. 9), a change in the position of the electrode portion 50 can be detected by the capacitive coupling sensor 20, that is, rotation information of the shift knob 10 can be obtained.

Also, in the case where the shift lever 2 is set in a state of being tilted relative to the rotation axis O of the shift knob 10 (the rotation axis O of the shift knob 10 and the central axis of the shift lever 2 do not coincide with each other) as shown by a dotted line in FIG. 9, even if the electrode portion 21 has a circular shape (a columnar shape), when the shift knob 10 is rotated, the shift lever 2 and the electrode portion 21 may rotate about the rotation axis O so as to draw a circle, and the position of the electrode portion 21 changes with the rotation of the shift knob 10. Thus, a change in the position of the electrode portion 50 can be detected by the capacitive coupling sensor 20, that is, rotation information of the shift knob 10 can be obtained.

Figure 10A:
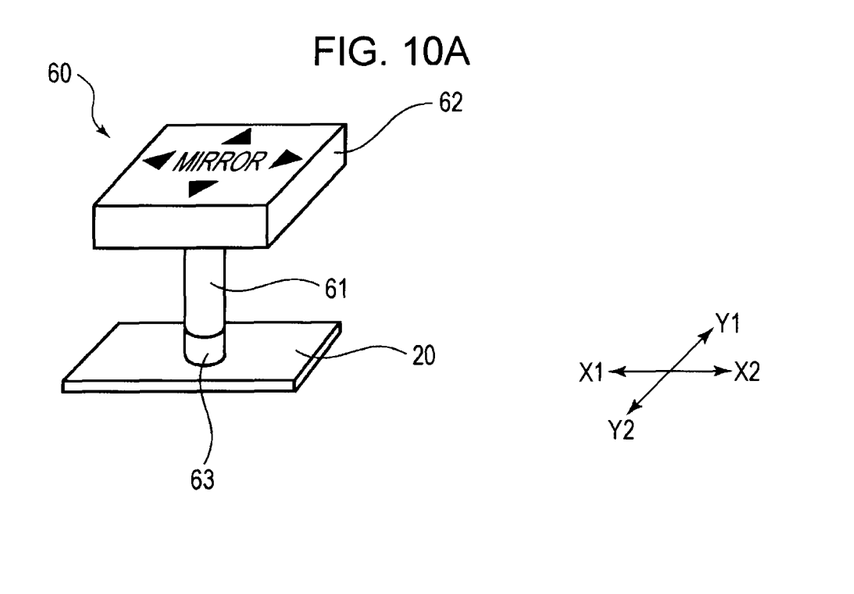
FIG. 10A is a partial perspective view of a mirror switch apparatus in which the position detection device according to an embodiment is used.
Figure 10B:
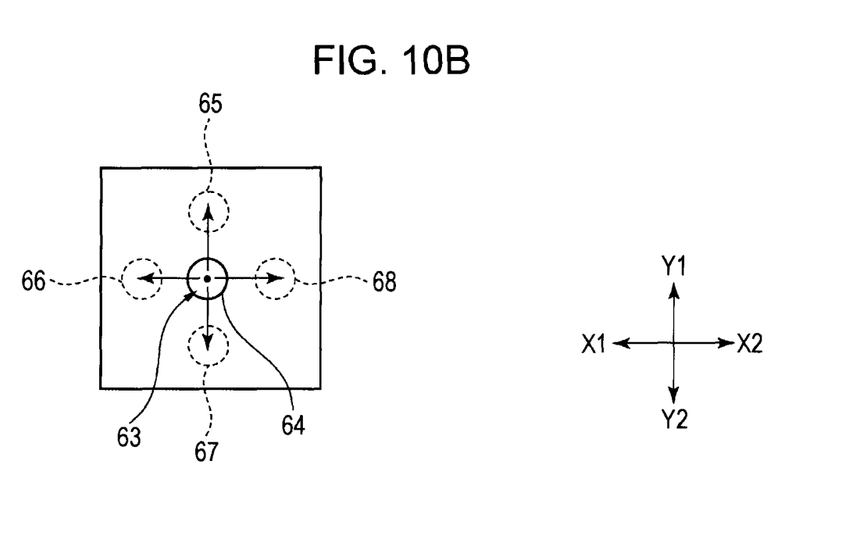
FIG. 10B is a plan view of the capacitive coupling sensor shown in FIG. 10A and, in particular, is a diagram schematically illustrating an operation pattern according to an embodiment of the present disclosure.

FIG. 10A is a partial perspective view of a mirror switch apparatus in which the position detection device of the embodiment is used, and FIG. 10B is a plan view of a capacitive coupling sensor shown in FIG. 10A and, in particular, is a diagram schematically illustrating an operation pattern.

FIG. 10A shows the mirror switch apparatus 60 in which an operation portion 62 may be provided on an upper portion of a shaft 61 and an electrode portion 63 may be provided on a lower end of the shaft 61. The electrode portion 63 and the capacitive coupling sensor 20 may be in non-contact with each other. The operation portion 62 can be operated to move from a central position in the directions of arrows shown in FIG. 10A (left and right (X1-X2) and front and back (Y1-Y2)), and accordingly, the electrode portion 63 can move from a determination area 64 for the central position on the capacitive coupling sensor 20 to determination areas 65 to 68 for respective positions of front, back, left, and right. Arrows shown in FIG. 10B indicate movement trajectories between the determination areas for the respective positions of the electrode portion 63. By detection of the position of the electrode portion 63 with the capacitive coupling sensor 20, each position information and movement trajectory information can be obtained.

Figure 11A:
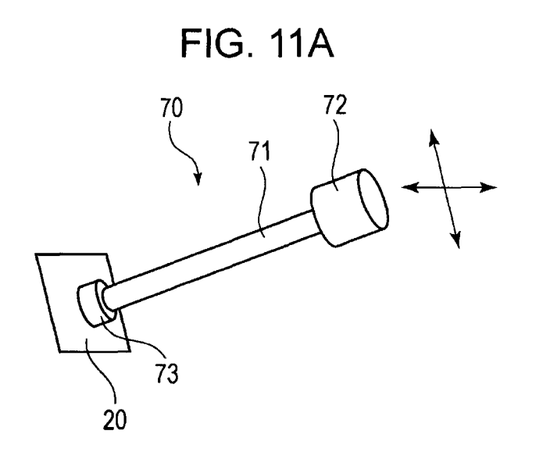
FIG. 11A is a partial perspective view of a stoke switch apparatus in which the position detection device according to an embodiment is used.
Figure 11B:
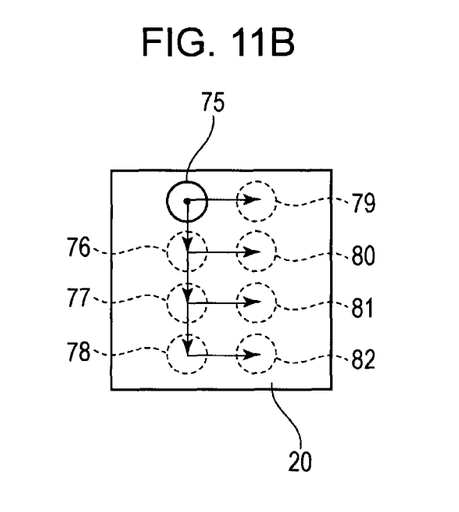
FIG. 11B is a plan view of the capacitive coupling sensor shown in FIG. 11A and, in particular, is a diagram schematically showing an operation pattern according to an embodiment of the present disclosure.

FIG. 11A is a partial perspective view of a stoke switch apparatus in which the position detection device of the embodiment is used, and FIG. 11B is a plan view of a capacitive coupling sensor shown in FIG. 11A and, in particular, is a diagram schematically showing an operation pattern.

FIG. 11A shows the stoke switch apparatus 70 in which an operation portion 72 may be provided on an upper portion of a shaft 71 and an electrode portion 73 may be provided on a lower end of the shaft 71. The electrode portion 73 and the capacitive coupling sensor 20 may be in non-contact with each other. As shown in FIG. 11A, the operation portion 72 can be operated to move in four directions. By the movement operation of the operation portion 72, the electrode portion 73 can move between determination areas 75 to 82 for respective positions on the capacitive coupling sensor 20. Arrows shown in FIG. 11B indicate movement trajectories between the determination areas for the respective positions of the electrode portion 73. By detection of the position of the electrode portion 73 with the capacitive coupling sensor 20, each position information and movement trajectory information can be obtained.

In the above, the position detection device of the embodiment has been described as an in-vehicle device, but is not limited to the in-vehicle device.

Accordingly, the embodiments of the present inventions are not to be limited in scope by the specific embodiments described herein. Further, although some of the embodiments of the present disclosure have been described herein in the context of a particular implementation in a particular environment for a particular purpose, those of ordinary skill in the art should recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

What is claimed is:

1. A position detection device, comprising:
   a movable body;
   a restricting plate in which a shift pattern is formed, the movable body being positioned inside the shift pattern;
   an operation portion provided on a first end side of the movable body;
   an electrode portion provided on a second end of the movable body, the second end being located opposite to the first end;
   a support body movably supporting the movable body such that the operation portion is operable to move; and
   a capacitive coupling sensor located in non-contact with the electrode portion,
   wherein, by a movement operation of the operation portion, the movable body moves between plural positions along the shift pattern, and the electrode portion moves while keeping non-contact with a surface of the capacitive coupling sensor, and the capacitive coupling sensor detects a position of the electrode portion on the basis of a capacitance change caused with movement of the electrode portion.

2. The position detection device according to claim 1, wherein the movable body is supported so as to be horizontally movable.

3. The position detection device according to claim 1, wherein
   the movable body is rotatably supported via an operation fulcrum between the first end and the second end, and
   the electrode portion moves in a direction opposite to a direction in which the operation portion is operated to move.

4. The position detection device according to claim 3, wherein further comprising:
   a spacer is provided on the surface of the capacitive coupling sensor so as to be in non-contact with the electrode portion, the surface of the capacitive coupling sensor facing the electrode portion, and
   a surface of the spacer is formed as such a concavely curved surface that a thickness of the spacer increases as distance from the operation fulcrum along a plane direction increases.

5. The position detection device according to claim 1, wherein
   the operation portion is operable to move along a predetermined trajectory between a plurality of positions, and
   position information and trajectory information of the operation portion is obtained by detection of the position of the electrode portion with the capacitive coupling sensor.

6. The position detection device according to claim 5, wherein the movable body is supported so as to be horizontally movable.

7. The position detection device according to claim 5, wherein
   the movable body is rotatably supported via an operation fulcrum between the first end and the second end, and
   the electrode portion moves in a direction opposite to a direction in which the operation portion is operated to move.

8. The position detection device according to claim 7, wherein further comprising:
   a spacer is provided on the surface of the capacitive coupling sensor so as to be in non-contact with the electrode portion, the surface of the capacitive coupling sensor facing the electrode portion, and
   a surface of the spacer is formed as such a concavely curved surface that a thickness of the spacer increases as distance from the operation fulcrum along a plane direction increases.

9. The position detection device according to claim 1, wherein a spacer is provided on the surface of the capacitive coupling sensor so as to be in non-contact with the electrode portion, the surface of the capacitive coupling sensor facing the electrode portion.

* * * * *